United States Patent
Shimosakoda

(10) Patent No.: US 7,293,185 B2
(45) Date of Patent: Nov. 6, 2007

(54) CLOCK CONTROL CIRCUIT AND CLOCK CONTROL METHOD THAT SWITCHINGLY SUPPLIES A HIGH-SPEED CLOCK AND A LOW-SPEED CLOCK

(75) Inventor: Yoshinori Shimosakoda, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 299 days.

(21) Appl. No.: 10/784,783

(22) Filed: Feb. 24, 2004

(65) Prior Publication Data
US 2005/0022044 A1 Jan. 27, 2005

(30) Foreign Application Priority Data
Jul. 22, 2003 (JP) .............................. 2003-277766

(51) Int. Cl.
*G06F 1/32* (2006.01)
(52) U.S. Cl. ...................................... 713/322; 713/600
(58) Field of Classification Search ................ 713/320, 713/322
See application file for complete search history.

(56) References Cited

U.S. PATENT DOCUMENTS

| | | | | |
|---|---|---|---|---|
| 5,083,266 A | * | 1/1992 | Watanabe | 713/601 |
| 5,142,684 A | * | 8/1992 | Perry et al. | 713/320 |
| 5,222,239 A | * | 6/1993 | Rosch | 713/322 |
| 5,504,908 A | * | 4/1996 | Ikeda | 713/300 |
| 5,579,353 A | * | 11/1996 | Parmenter et al. | 375/376 |
| 5,664,201 A | * | 9/1997 | Ikedea | 713/320 |
| 5,692,201 A | * | 11/1997 | Yato | 713/322 |
| 5,903,746 A | * | 5/1999 | Swoboda et al. | 713/501 |
| 5,907,699 A | | 5/1999 | Nakajima | |
| 6,198,820 B1 | * | 3/2001 | Tetsushi | 379/413 |
| 6,239,626 B1 | * | 5/2001 | Chesavage | 327/99 |
| 6,763,471 B1 | * | 7/2004 | Aoyama | 713/320 |
| 6,973,584 B2 | * | 12/2005 | Na et al. | 713/323 |
| 2003/0237012 A1 | * | 12/2003 | Jahagirdar et al. | 713/500 |
| 2004/0221187 A1 | * | 11/2004 | Durand et al. | 713/300 |

FOREIGN PATENT DOCUMENTS

| | | | |
|---|---|---|---|
| EP | 000419908 A2 | * | 4/1991 |
| JP | 61123916 | | 6/1986 |
| JP | 61147324 | | 7/1986 |
| JP | 8-16276 | | 1/1996 |
| JP | 10-145446 | | 5/1998 |

* cited by examiner

*Primary Examiner*—Chun Cao
(74) *Attorney, Agent, or Firm*—Volentine & Whitt, P.L.L.C.

(57) ABSTRACT

In this clock control circuit and this clock control method, during a standby-mode of a CPU, a low-speed clock is supplied. Processings including timer processing and receiving processing are carried out by low-speed operation at the CPU. When an interrupt signal is inputted to the CPU which is in the standby mode, a high-speed clock source is activated, and counting of the low-speed clock is started at a counter. When a count value of the counter reaches a set value of a register, a high-speed clock is selected by a selection signal. The high-speed clock is supplied to the CPU, and interruption processing is started.

12 Claims, 4 Drawing Sheets

CLOCK CONTROL CIRCUIT OF THE FIRST EMBODIMENT OF THE PRESENT INVENTION

CLOCK CONTROL CIRCUIT OF THE FIRST EMBODIMENT OF THE PRESENT INVENTION

CIRCUIT STRUCTURE

OPERATION

EXAMPLE OF SELECTOR 14 IN FIG. 1

OPERATION OF FIG. 1

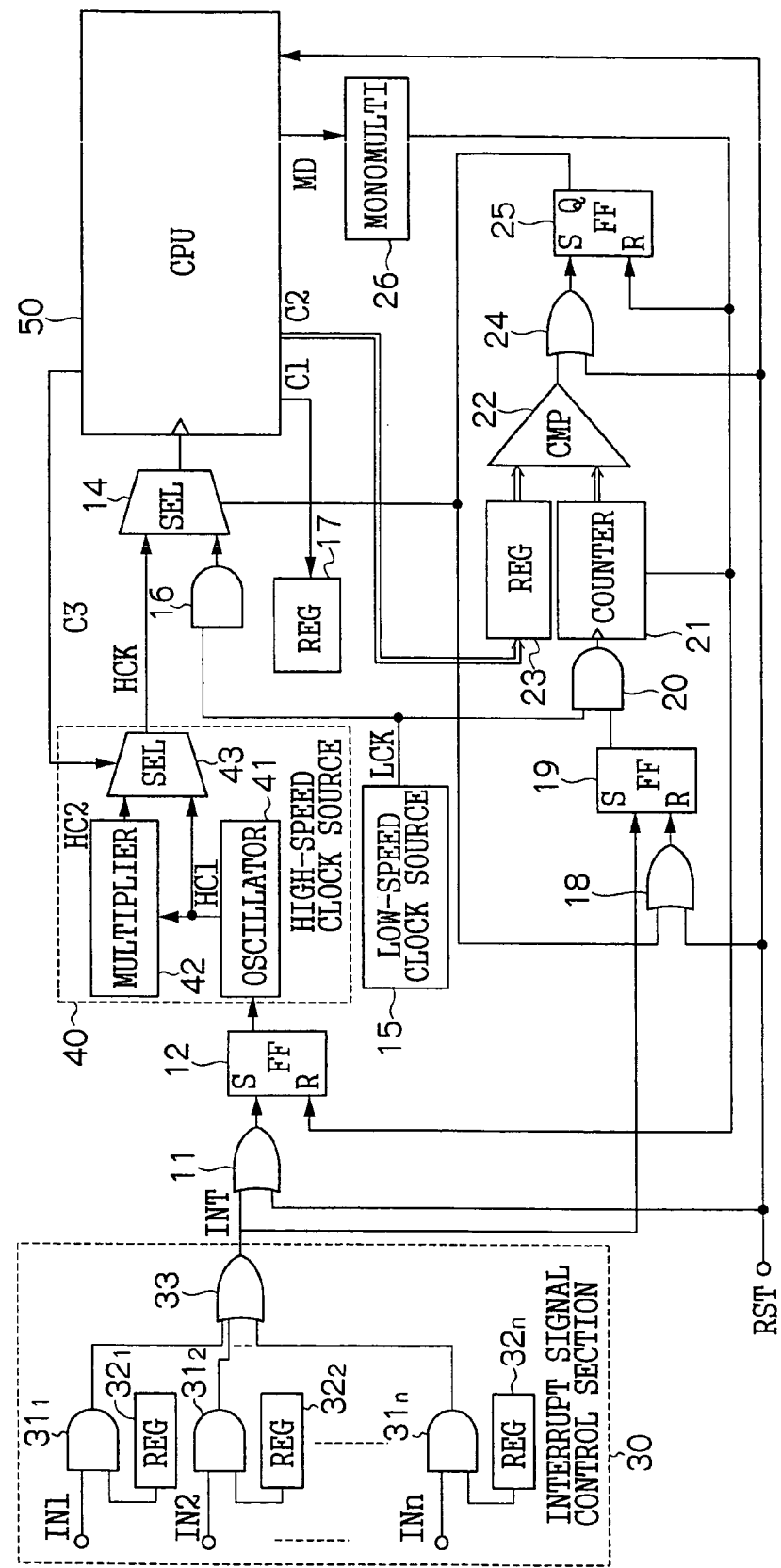
FIG.4 CLOCK CONTROL CIRCUIT OF THE SECOND EMBODIMENT OF THE PRESENT INVENTION

CLOCK CONTROL CIRCUIT AND CLOCK CONTROL METHOD THAT SWITCHINGLY SUPPLIES A HIGH-SPEED CLOCK AND A LOW-SPEED CLOCK

CROSS-REFERENCE TO RELATED APPLICATION

This application claims priority under 35 USC 119 from Japanese Patent Application No. 2003-277766, the disclosure of which is incorporated by reference herein.

BACKGROUND OF THE INVENTION

1. Technical Field

The present invention relates to a clock control circuit and a clock control method which switchingly supply a high-speed clock and a low-speed clock in accordance with the operational state of a system LSI.

2. Description of the Related Art

For example, Japanese Patent Application Laid-Open (JP-A) No. 10-145446 discloses a clock control section which, in order to reduce the consumption of electric power at a portable terminal, stops an operation clock, which is supplied to a central processing unit (hereinafter, "CPU"), at times when processing at the CPU is not required.

The clock control section is structured by an oscillation stopping/restoring control circuit which controls the starting and stopping of the oscillation of an oscillation circuit; a clock supply control circuit controlling whether or not a clock signal outputted from the oscillation circuit is to be outputted to a CPU; and a stable oscillation timer which is activated by an interrupt signal and counts low frequency clock signals. When the count value reaches a given value, the stable oscillation timer outputs a control signal to the clock supply control circuit in order for a clock signal to be outputted to the CPU.

At such a portable terminal, when processing by the CPU is completed, a control signal for stopping the oscillation circuit is outputted from the CPU to the oscillation stopping/restoring control circuit. In this way, the high-speed operation clock generated by the oscillation circuit is stopped, and the electric power consumed at the oscillation circuit and the CPU is reduced. During this time, a low frequency clock oscillator, a timer circuit, a receiving circuit, and the like continue to operate. When a predetermined period of time has passed or when a control signal is received from a base station or the like, an interrupt signal is outputted and is supplied to the oscillation stopping/restoring control circuit and the stable oscillation timer.

When the interrupt signal is supplied to the oscillation stopping/restoring control circuit, the oscillation stopping/restoring control circuit instructs the oscillation circuit to begin oscillation. On the other hand, the stable oscillation timer starts counting of a low frequency clock signal. Then, when the count value of the stable oscillation timer reaches a given value, a control signal for making the clock signal of the oscillation circuit be outputted to the CPU is outputted from the stable oscillation timer to the clock supply control circuit. In this way, the clock signal of the oscillation circuit, whose oscillation operation has stabilized after a predetermined period of time has elapsed, is supplied to the CPU.

However, a portable terminal equipped with a conventional clock control section has the following problems.

When processing at the CPU is completed, the clock signal for the CPU is completely stopped, and the mode proceeds to a standby mode. However, even during this standby mode, operation of the timer circuit, the receiving circuit, and the like must continue. Therefore, the timer circuit and the receiving circuit must be structured so as to operate completely independently of operation of the CPU. A problem arises in that there is the concern that the circuit structure will become complex.

SUMMARY OF THE INVENTION

An object of the present invention is to provide a clock control circuit in which, even during a standby mode, timer processing and receiving processing can be carried out by low-speed operation of a CPU due to a low-speed clock being supplied to the CPU.

In order to achieve the above object, a first aspect of the present invention is the following clock control circuit. The clock control circuit carries out control of a clock signal supplied to a CPU, and has a high-speed clock source, a low-speed clock source, a selector, and first and second control sections. Oscillation operation of the high-speed clock source is controlled by an operation control signal, and the high-speed clock source generates a high-speed clock used in a usual operation mode. The low-speed clock source always generates a low-speed clock whose frequency is lower than a frequency of the high-speed clock. The selector selects one of the high-speed clock and the low-speed clock in accordance with a selection signal, and outputs the selected one of the high-speed clock and the low-speed clock. When a standby mode is designated by a mode signal, the first control section outputs the operation control signal for stopping the high-speed clock source. When an interrupt signal is supplied, the first control section outputs the operation control signal for operating the high-speed clock source. When the standby mode is designated by the mode signal, the second control section outputs the selection signal for causing the low-speed clock to be selected. When the interrupt signal is supplied, the second control section starts counting of the low-speed clock. When the count value reaches a value set in a register, the second control section outputs the selection signal for causing the high-speed clock to be selected.

A second aspect of the present invention is the following clock control method. This is a clock control method which controls a clock signal supplied to a CPU by a clock control circuit having a high-speed clock source whose oscillation operation is controlled by an operation control signal and which generates a high-speed clock used in a usual operation mode, and a low-speed clock source always generating a low-speed clock whose frequency is lower than a frequency of the high-speed clock. The method includes the steps of: when a standby mode is designated by a mode signal, stopping the high-speed clock source, selecting the low-speed clock, and outputting the low-speed clock as the clock signal; and when an interrupt signal is supplied, operating the high-speed clock source and starting counting of the low-speed clock, and when a count value reaches a set value, selecting the high-speed clock and outputting the high-speed clock as the clock signal.

As described above in detail, the present invention has the first control section for stopping operation of the high-speed clock source at the time of the standby mode. Therefore, electric power consumption at the time of the standby mode can be reduced. Moreover, the present invention has the second control section which, at the time of the standby mode, selects the low-speed clock. When an interrupt signal is supplied, the second control section starts counting of the low-speed clock. When the counted value reaches a set value, the second control section selects the high-speed clock. Accordingly, even during the standby mode as well, it is possible to supply the low-speed clock to the CPU, and timer processing and receiving processing can be executed by low-speed operation of the CPU. Moreover, at the time of interruption, the interruption processing is started at a stable high-speed clock. Therefore, misoperation caused by an unstable clock can be prevented.

BRIEF DESCRIPTION OF THE DRAWINGS

FIG. 4 is a structural diagram of a clock control circuit showing a second embodiment of the present invention.

DETAILED DESCRIPTION OF THE INVENTION

In one mode of the present invention, a high-speed clock source, whose oscillation operation is controlled by an operation control signal and which generates a high-speed clock used in a usual operation mode, and a low-speed clock source, which always generates a low-speed clock whose frequency is lower than that of the high-speed clock, are provided. When a standby mode is designated by a mode signal, the high-speed clock source is stopped, and the low-speed clock is selected and is outputted to the CPU as the clock signal. Further, when an interrupt signal is supplied, the high-speed clock source is operated, and counting of the low-speed clock is started. When the counted value thereof reaches a set value, the high-speed clock is selected and is outputted to the CPU as the clock signal.

First Embodiment

Figure 1:
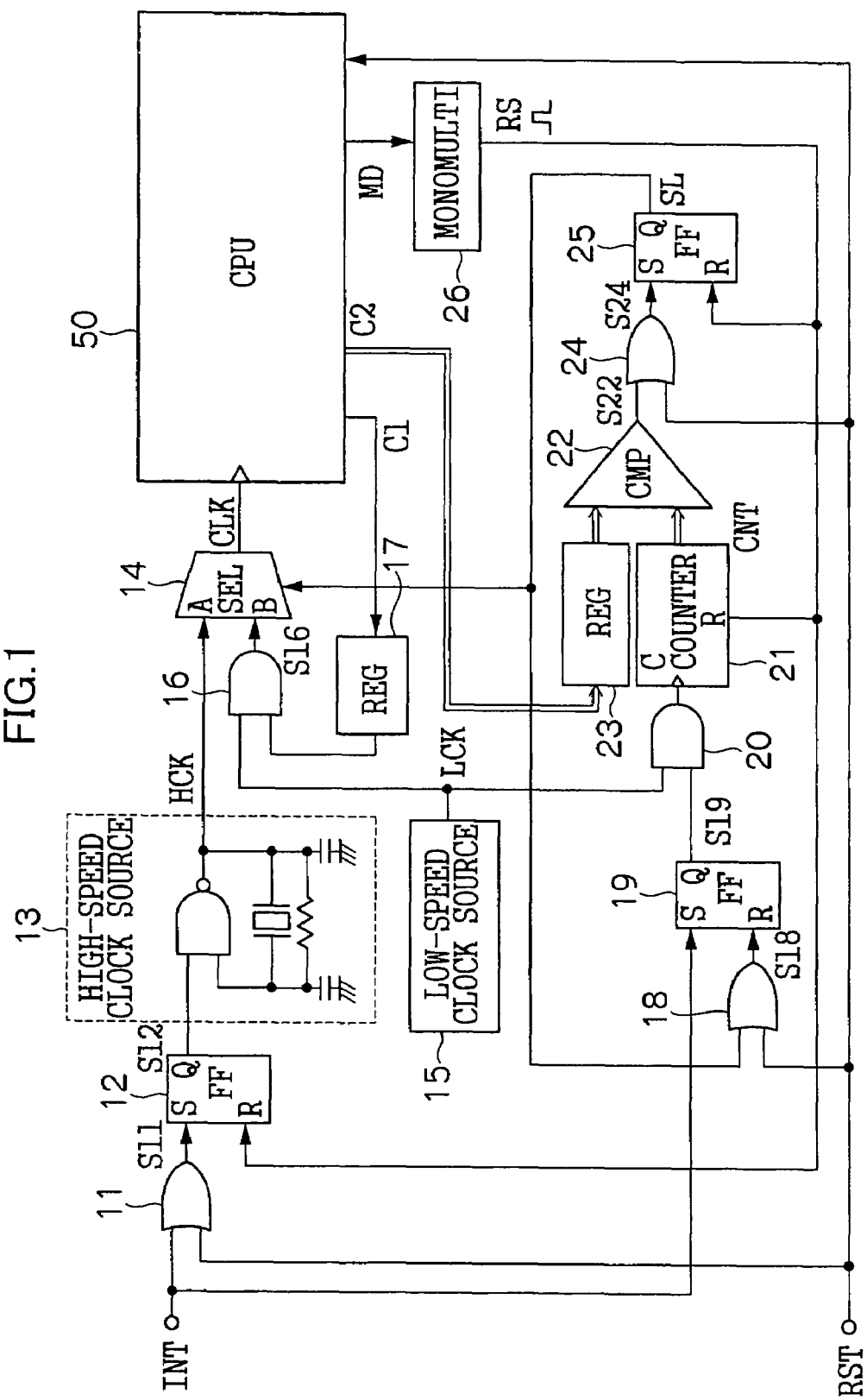
FIG. 1 is a structural diagram of a clock control circuit showing a first embodiment of the present invention.

FIG. 1 is a structural diagram of a clock control circuit showing a first embodiment of the present invention. The clock control circuit is for supplying a stable clock signal CLK in accordance with the operational mode of a CPU 50 by, for example, a cellular phone or a wireless LAN. The clock control circuit has a two-input OR gate (hereinafter called an "OR") 11 to which a reset signal RST and an interrupt signal INT are supplied from the exterior.

The reset signal RST is a signal which is for setting the initial states of registers in the CPU 50 by becoming level "H" for example. When, for example, the power source is turned on, the reset signal RST is supplied from an unillustrated reset signal generating section so as to be "H" for a predetermined time, until the operation of a clock generating source becomes stable. On the other hand, the interrupt signal INT is a signal which becomes "H" when, for example, a control signal from a base station is received at an unillustrated receiving circuit.

The output side of the OR 11 is connected to a set terminal S of a set/reset type flip-flop (hereinafter called "FF") 12. A signal S12 for a high-speed clock source 13 is outputted from an output terminal Q of the FF 12. As is illustrated, the high-speed clock source 13 generates a high-speed clock HCK of 12 MHz by, for example, using a two-input negative AND gate (hereinafter called "NAND") as an inverting amplifier and by using a liquid crystal oscillator or the like at a feedback circuit. Due to the signal S12 being supplied to the input terminal of the NAND of the high-speed clock source 13, the operation of the high-speed clock source 13 can be controlled. The output side of the high-speed clock source 13 is connected to an input terminal A of a selector (SEL) 14 at which no hazard arises at the time of switching.

The clock control circuit has a low frequency clock source 15. The low frequency clock source 15 always outputs a low-speed clock LCK of, for example, 32.768 kHz for timing, at the time when the power source is turned on, regardless of the operational mode of the CPU 50. The output side of the low frequency clock source 15 is connected to one input side of a two-input AND gate (hereinafter called "AND") 16. The output side of a register 17 is connected to the other input side of the AND 16. The output side of the AND 16 is connected to an input terminal B of the selector 14.

The register 17 is for carrying out, in accordance with a control signal C1 from the CPU 50, setting as to whether or not the low-speed clock LCK is to be supplied at the time of the standby mode of the CPU 50. The selector 14 selects input terminals A, B in accordance with the level "H", "L" of a selection signal SL which will be described later, and supplies, from the output terminal thereof, the clock signal CLK to the CPU 50.

The reset signal RST and the selection signal SL are supplied as input signals of an OR 18. The output side of the OR 18 is connected to a reset terminal R of an FF 19. The interrupt signal INT is supplied to a set terminal S of the FF 19. The output side of the FF 19 is connected to one input side of an AND 20. The low-speed clock LCK is supplied from the low-speed clock source 15 to the other input side of the AND 20. The output side of the AND 20 is connected to a clock terminal C of a counter 21.

The counter 21 increases a count value CNT by one and outputs the count value CNT, at, for example, each rise of the signal supplied to the clock terminal C. The output side of the counter 21 is connected to one input side of a comparator (CMP) 22. The output signal of a register 23 is supplied to the other input side of the comparator 22.

In accordance with a control signal C2 from the CPU 50, the register 23 sets a value corresponding to a stable time of the time of activation of the high-speed clock source 13. The output side of the comparator 22 is connected to one input side of an OR 24. The reset signal RST is supplied to the other input side of the OR 24. The output side of the OR 24 is connected to a set terminal S of an FF 25. The selection signal SL is outputted from an output terminal Q of the FF 25.

The CPU 50 has the function of outputting a mode signal MD expressing whether the mode is the usual operation mode or the standby mode. This mode signal MD is supplied to a monostable multivibrator (hereinafter called "monomulti") 26. When, for example, the mode signal MD rises from "L" to "H" when the mode proceeds to the standby mode, the monomulti 26 outputs a reset signal RS which is "H" for a given time. The reset signal RS is supplied to the FFs 12, 25 and to a reset terminal R of the counter 21.

Figure 2A:
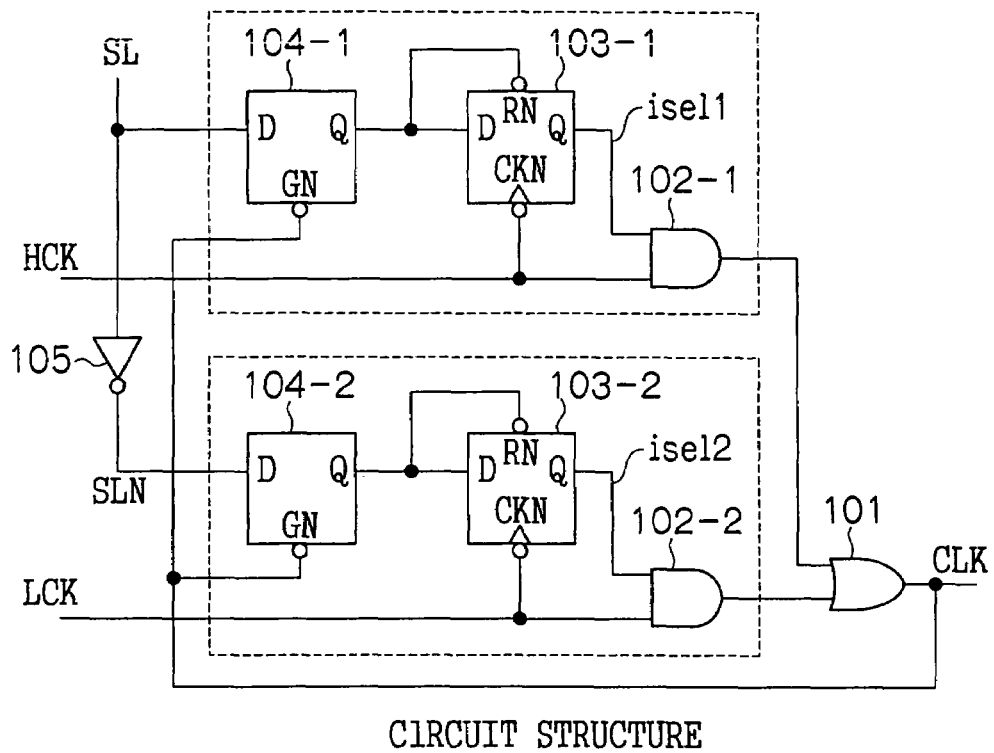
FIG. 2A is a circuit diagram showing an example of a selector 14 in FIG. 1.
Figure 2B:
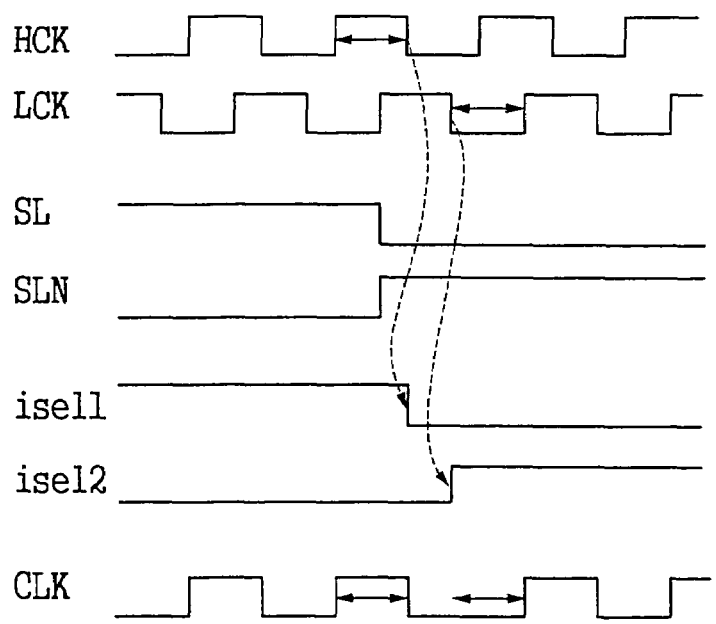
FIG. 2B is a time chart of operation of the circuit diagram shown in FIG. 2A.

FIGS. 2A and 2B are explanatory diagrams showing an example of the selector 14 in FIG. 1. FIG. 2A is a circuit structural diagram, and FIG. 2B is a time chart of operation.

As shown in FIG. 2A, the selector 14 is structured so as to switch the two systems of clocks HCK, LCK in accordance with the selection signal SL. Reference numeral 101 is a two-input OR, 102-1 and 102-2 are two-input ANDs, 103-1 and 103-2 are each a negative edge operation D-type FF (hereinafter called "D-FF") which is equipped with a reset input and which has an input signal D, a clock input CKN, an asynchronous reset signal RN, and an output signal Q, 104-1 and 104-2 are each a low-through latch having an input signal D, a gate control signal GN and a gate output Q, and 105 is an inverter.

At the negative edge operation D-FFs 103-1, 103-2 which are equipped with a reset input, when the reset input RN is "L", the output Q is reset to "L", and synchronously with the fall of the clock input CKN, the output Q sets the input D.

The low-through latches 104-1, 104-2 operate such that, while the gate control signal GN is "L", the input signal D is outputted as is from the gate output Q, and while GN is "H", the value of the gate output Q is held. The selection signal SL and a selection signal SLN, which has been inverted at the inverter 105, are respectively connected to the input signals D of the low-through latches 104-1, 104-2, and the output clock signal CLK is connected to the gate control signals GN.

The outputs Q of the low-through latches 104-1, 104-2 are connected to the input signals D and the asynchronous reset signals RN of the D-FFs 103-1, 103-2, respectively. The clocks HCK, LCK are connected to the clock signals CKN.

Further, the output signals Q of the D-FFs 103-1, 103-2 are called isel1, isel2, respectively. The clock HCK and isel1 are connected to the two-input AND 102-1, and the clock LCK and isel2 are connected to the two-input AND 102-2. The output signals of these two-input ANDs are connected as input signals of the two-input OR 101, and the output thereof becomes the clock signal CLK. Note that the selection signals SL, SLN are complementary, and when one is "H", the other is "L".

As shown in FIG. 2B, at the selector 14, first, in the state in which SL="H" (valid in the state in which the high-speed clock HCK is selected) and SLN="L", the clock signals HCK, LCK are in the operational state. In this state, because isel1="H" and isel2="L", the high-speed clock HCK is outputted from only the circuit of 102-1 among the two-input ANDs, and the high-speed clock HCK is outputted from the two-input OR 101 as the clock signal CLK. This clock signal CLK is inputted to the gate control signals GN of the low-through latches 104-1, 104-2.

Next, when the state switches from the above-described state to SL="L", SL="H" (valid when selecting the low-speed clock LCK), at the time of the state in which the high-speed clock HCK="L", the clock signal CLK becomes "L", and the output Q of the low-through latch 104-1 becomes "L", and the asynchronous reset input RN of the D-FF 103-1 becomes "L". Therefore, there is a transition to isel1="L". This change is carried out during the time that HCK="L", provided that the period during which the high-speed clock HCK="L" is not shorter than the time of the change from HCK="L"→CLK="L"→isel1="L". Therefore, the time period of the next HCK="H" is not outputted to the CLK. Further, while HCK="H", there is no change to isel1="L". Thus, the period of time during which the clock signal CLK, which is outputted from the final high-speed clock HCK, is "H" does not become short. Therefore, when switching the clock, a clock signal CLK without hazard can be outputted.

Figure 3:
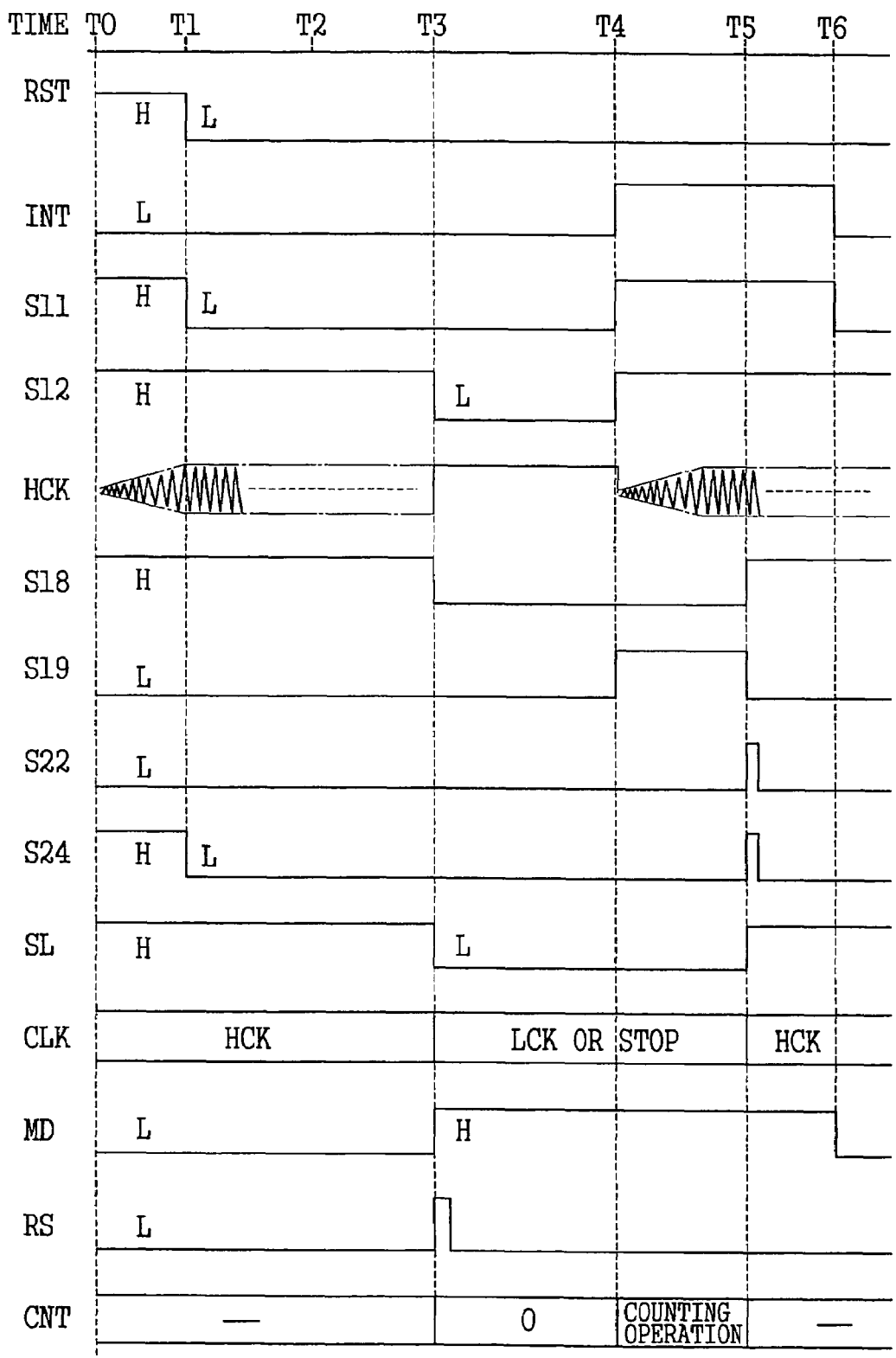
FIG. 3 is a signal waveform diagram showing operation of FIG. 1.

FIG. 3 is a signal waveform diagram showing operation of FIG. 1. Hereinafter, operation of FIG. 1 will be described with reference to FIG. 3.

When the power source is turned on at time T0 in FIG. 3, the reset signal RST, which is supplied from an unillustrated reset signal generating section, is "H" during the period of time from time T0 to time T1. At this time, the interrupt signal INT supplied from the exterior is "L".

When the power source is turned on at time T0, due to the reset signal RST, the signal S11 outputted from the OR 11 becomes "H", the FF 12 is set, and the output signal S12 thereof becomes "H". The oscillation operation of the high-speed clock source 13 is thereby started. The amplitude of the high-speed clock HCK outputted from the high-speed clock source 13 gradually increases, and after a given time, becomes a predetermined amplitude and is stable.

Further, due to the reset signal RST becoming "H", a signal S24 outputted from the OR 24 becomes "H", the FF 25 is set, and the selection signal SL becomes "H". In this way, the input terminal A side is selected at the selector 14, and the high-speed clock HCK of the high-speed clock source 13 is supplied to the CPU 50 as the clock signal CLK. However, because the "H" reset signal RST is being supplied to the CPU 50, operation by the CPU 50 is not carried out during this time.

When the reset signal RST becomes "L" at time T1, the output signals S11, S24 of the ORs 11, 24 become "L". However, because the reset signal RS outputted from the monomulti 26 is "L", the FFs 12, 25 remain set, and the signals S12, SL thereof do not change and remain "H". Here, due to the reset signal RST becoming "L", operation of the CPU 50 is started. At this point in time, operation such as initial setting or the like is started, with the high-speed clock HCK which has become stable being the clock signal. In this initial setting operation, the control signals C1, C2 are outputted to the registers 17, 23, and predetermined values are set at the registers 17, 23.

At time T2, the initial setting operation at the CPU 50 is completed, and processing proceeds to processing in the usual operation mode.

At time T3, when the processing in the usual operation mode ends and the mode proceeds to the standby mode, the mode signal MD outputted from the CPU 50 switches from "L" to "H". In this way, the reset signal RS outputted from the monomulti 26 becomes "H" for a given time, the FFs 12, 25 and the counter 21 are reset, the signal S12 and the selection signal SL become "L", and the count value CNT of the counter 21 becomes 0.

Due to the signal S12 becoming "L", operation of the high-speed clock source 13 is stopped, and the selection signal SL becomes "L". The selector 14 is thereby switched to the input terminal B side. Accordingly, if the register 17 is set to "H", the low-speed clock LCK outputted from the low-speed clock source 15 is supplied to the CPU 50 as the clock signal CLK. Further, if the register 17 is set to "L", the supply of the clock signal CLK to the CPU 50 is stopped. In this way, the CPU 50 proceeds to the standby mode.

At time T4, when, for example, the receiving circuit receives a control signal from a base station, the interrupt signal INT outputted from the receiving circuit becomes "H". In this way, the FFs 12, 19 are set, and the signals S12, S19 become "H". Due to the signal S12 becoming "H", the oscillation operation of the high-speed clock source 13 is started. The amplitude of the high-speed clock HCK gradually increases, and after a given time, becomes a predetermined amplitude and is stable. Further, due to the signal S19 becoming "H", the low-speed clock LCK is supplied to the counter 21, and counting operation by the counter 21 is started.

At time T5, when the count value CNT of the counter 21 matches the value set at the register 23, a signal S22 outputted from the comparator 22 becomes "H", the FF 25 is set, and the selection signal SL becomes "H". In this way, the FF 19 is reset, and the counting operation of the counter 21 is stopped. Moreover, the selector 14 is switched to the input terminal A side, the high-speed clock HCK is supplied to the CPU 50 as the clock signal CLK, and processing corresponding to the interrupt signal INT is started by the CPU 50.

At time T6, the mode signal MD outputted from the CPU 50 returns to "L", and an instruction to make the interrupt signal INT return to "L" is outputted from the CPU 50 to the receiving circuit. In this way, the CPU 50 assumes the usual operation mode state which is the same as that at time T2. Thereafter, operations which are the same as those at times T3-T6 are repeated.

Note that, when the interrupt signal INT becomes "H" during operation in the usual operation mode, the high-speed clock HCK is continuously supplied as the clock signal CLK to the CPU 50, and the state of the clock control circuit does not change. However, the interrupt signal INT is supplied to the CPU 50 by an unillustrated route, and interruption processing is carried out by the CPU 50.

As described above, the clock control circuit of the first embodiment has the selector 14 and the register 17 which, at the time of the standby mode, sets whether or not the low-speed clock LCK is to be supplied to the CPU 50.

In this way, there is the advantage that the clock signal CLK which is appropriate for the CPU 50 can be supplied in accordance with the contents of processing of the CPU 50 which is in the standby mode. Moreover, the clock control circuit has the register 23 which sets the period of time from the activation of the high-speed clock source 13 to the actual supply of the high-speed clock HCK to the CPU 50. Therefore, there is the advantage that the operation of the CPU 50 can be carried out by the clock signal CLK which has become stable at an appropriate time. Moreover, because a circuit structure which does not cause any hazard during switching is used, there is no fear that misoperation will be caused during clock switching, and stable operation is possible.

Second Embodiment

FIG. 4 is a structural diagram of a clock control circuit showing a second embodiment of the present invention. Elements which are the same as elements in FIG. 1 are denoted by the same reference numerals.

In this clock control circuit, an interrupt signal control section 30 is added to the clock control circuit of FIG. 1. Further, a high-speed clock source 40, which can switchingly output two types of high-speed clocks, is provided in place of the high-speed clock source 13.

The interrupt signal control section 30 is a structure for using an arbitrary signal from among a plurality of interrupt cause signals IN1, IN2, . . . , INn, as the interrupt signal INT. The interrupt signal control section 30 has, in correspondence with the respective interrupt cause signals In$i$ (i=1~n), two-input ANDs 31$i$, and registers 32$i$ setting whether or not the interrupt cause signals In$i$ thereof are to be used. The interrupt signal control section 30 also has an n-input or 33 which is for outputting, as the interrupt signal INT, the logical sum of the output signals of these ANDs 31$i$. Note that, although not illustrated, the contents of the respective registers 32$i$ can be set freely from the CPU 50.

The high-speed clock source 40 is structured by an oscillator 41 which is similar to that of the high-speed clock source 13 in FIG. 1; a multiplier 42 which is formed by a PLL circuit, and which multiplies by two a high-speed clock HC1 outputted from the oscillator 41 and generates a high-speed clock HC2; and a selector 43 which selects and outputs either one of the high-speed clocks HC1, HC2 in accordance with a control signal C3 from the CPU 50. The other structures are the same as those in FIG. 1.

The operation of this clock control circuit is the same as that of the clock control circuit in FIG. 1, except for the following points: by setting the registers 32$i$ in the interrupt signal control section 30, an arbitrary one of or an arbitrary plurality of the interrupt cause signals IN$i$ can be used as the actual interrupt signal INT; and the speed of the high-speed clock HCK can be selected by the control signal C3 from the CPU 50.

As described above, because the clock control circuit of the second embodiment has the interrupt signal control section 30 and the high-speed clock source 40, in addition to the same advantages as in the first embodiment, there are the advantages that arbitrary interrupt cause signals IN$i$ can be used, and that the speed of the high-speed clock HCK can be selected in accordance with the operational state.

Note that the present invention is not limited to the above-described embodiments, and various modifications are possible. The following structures are modified examples.

(a) The frequencies of the high-speed clock HCK and the low-speed clock LCK are arbitrary.

(b) Although the high-speed clock source 40 in FIG. 4 has the multiplier 42 which multiplies the output signal from the oscillator 41 by two, the number by which the multiplier 42 carries out multiplication is arbitrary. Further, in place of the multiplier 42, a frequency divider may be used. Moreover, a structure may be used in which one frequency among three or more types of frequencies can be selected.

(c) Explanation was given by using a logic in which each signal is "H" when active. However, the actual logic circuit may be structured such that the signals are "L" when active.

(d) The circuit structure of the selector 14 is not limited to that shown in FIG. 2A.

What is claimed is:

1. A clock control circuit carrying out control of a clock signal supplied to a central processing unit, the clock control circuit comprising:
   a high-speed clock source whose oscillation operation is controlled by an operation control signal, and which generates a high-speed clock used in a usual operation mode;
   a low-speed clock source generating a low-speed clock whose frequency is lower than a frequency of the high-speed clock;
   a selector selecting one of the high-speed clock and the low-speed clock in accordance with a selection signal, and outputting the selected one of the high-speed clock and the low-speed clock to the central processing unit;
   a first control section that outputs the operation control signal for stopping the high-speed clock source responsive to a standby mode designated by a mode signal, that outputs the operation control signal for operating the high-speed clock source responsive to an interrupt signal, and that sets initial states of the central processing unit and causes the high-speed clock to be generated by the high-speed clock source a set time after a power source has been turned on, responsive to a reset signal; and
   a second control section which, when the standby mode is designated by the mode signal, outputs the selection signal for causing the low-speed clock to be selected, and which, when the interrupt signal is supplied, starts counting of the low-speed clock, and when a count value reaches a value set in a register, the second control section outputs the selection signal for causing the high-speed clock to be selected.

2. The clock control circuit of claim 1, further comprising an interrupt signal control section which selects an arbitrary one of or plurality of signals from a plurality of interrupt cause signals, and when a cause for interruption arises at any of the selected signals, the interrupt signal control section outputs the interrupt signal.

3. The clock control circuit of claim 1, wherein the first control section includes an OR gate to which the reset signal and the interrupt signal are input, and a flip-flop which is connected to an output side of the OR gate.

4. The clock control circuit of claim 1, wherein the second control section includes an OR gate to which the reset signal and the selection signal are input, a flip-flop which is connected to an output side of the OR gate, an AND gate which is connected to an output side of the flip-flop, and a counter which is connected to an output side of the AND gate, the low-speed clock is input from the low-speed clock source to the AND gate, and the counter carries out the counting of the low-speed clock.

5. The clock control circuit of claim 1, wherein, in order to switch between clocks of two systems, the selector includes a two-input OR gate, a two-input AND gate, a flip-flop having a reset input, a low-through latch, and an inverter.

6. The clock control circuit of claim 1, wherein the high-speed clock source includes an oscillator, and a multiplier which multiplies by a predetermined number the high-speed clock outputted from the oscillator.

7. The clock control circuit of claim 1, wherein the high-speed clock source includes an oscillator, and a frequency divider which processes the high-speed clock outputted from the oscillator.

8. The clock control circuit of claim 2, wherein the high-speed clock source is structured so as to be able to select and output one high-speed clock from among a plurality of frequencies.

9. The clock control circuit of claim 4, further comprising a comparator which is connected to an output side of the counter, and a register for setting a value corresponding to a stable time at a time of activation of the high-speed clock source in accordance with a control signal from the central processing unit, wherein the register supplies an output signal to the comparator.

10. The clock control circuit of claim 5, wherein the flip-flop has input thereto an input signal, a clock input, an asynchronous reset signal, and provides an output signal, and the low-through latch has input thereto another input signal, a gate control signal, and provides a gate output, and when the asynchronous reset signal at the reset input is a first signal, the gate output is reset in accordance with the first signal, and the gate output sets the another input signal synchronously with a fall of the clock input.

11. The clock control circuit of claim 1, wherein the high-speed clock source can generate the high-speed clock, so as to select one frequency from among two or three or more frequencies.

12. The clock control circuit of claim 9, further comprising:

a second OR gate which is connected to an output side of the comparator, wherein the reset signal is inputted to another input side of the second OR gate; and an output side of the second OR gate is connected to a set terminal of the second flip-flop.

\* \* \* \* \*